(12) United States Patent
Yoneyama

(10) Patent No.: US 12,527,812 B2
(45) Date of Patent: Jan. 20, 2026

(54) ESOPHAGEAL STRICTURE SUPPRESSING AGENT

(71) Applicant: TME THERAPEUTICS INC., Minato-ku (JP)

(72) Inventor: Hiroyuki Yoneyama, Minato-ku (JP)

(73) Assignee: TME THERAPEUTICS INC., Minato-ku (JP)

( * ) Notice: Subject to any disclaimer, the term of this patent is extended or adjusted under 35 U.S.C. 154(b) by 977 days.

(21) Appl. No.: 17/609,264

(22) PCT Filed: May 8, 2019

(86) PCT No.: PCT/JP2019/018365
§ 371 (c)(1),
(2) Date: Nov. 5, 2021

(87) PCT Pub. No.: WO2020/225871
PCT Pub. Date: Nov. 12, 2020

(65) Prior Publication Data
US 2022/0184110 A1 Jun. 16, 2022

(51) Int. Cl.
| | | |
|---|---|---|
| C07H 21/02 | (2006.01) | |
| A61K 31/713 | (2006.01) | |
| A61P 1/00 | (2006.01) | |
| C07H 21/04 | (2006.01) | |

(52) U.S. Cl.
CPC .............. *A61K 31/713* (2013.01); *A61P 1/00* (2018.01)

(58) Field of Classification Search
CPC .......................... C12N 15/113; C12N 2310/14
See application file for complete search history.

(56) References Cited

U.S. PATENT DOCUMENTS

| | | | |
|---|---|---|---|
| 2011/0027248 A1 | 2/2011 | Yoneyama et al. | |
| 2015/0337313 A1 | 11/2015 | Yoneyama et al. | |
| 2018/0318430 A1 | 11/2018 | Yoneyama | |
| 2020/0093850 A1 | 3/2020 | Yoneyama | |

FOREIGN PATENT DOCUMENTS

| | | | |
|---|---|---|---|
| WO | WO 2009/084232 A1 | 7/2009 | |
| WO | WO 2014/013535 A1 | 1/2014 | |
| WO | WO 2017/078054 A1 | 5/2017 | |
| WO | WO 2018/105708 A1 | 6/2018 | |
| WO | WO-2018183934 A1 * | 10/2018 | ......... A61K 31/7105 |

OTHER PUBLICATIONS

Suzuki et al. (Journal of Crohn's and Colitis, 2017, 221-228).*
Elbashir et al. (The EMBO Journal, vol. 20, No. 23, pp. 6877-6888, 2001).*
Sato et al. (Endoscopy, 2017, 48(05), 491-497).*
International Search Report issued on Jun. 11, 2019 in PCT/JP2019/018365 filed May 8, 2019, citing documents AA-AB, AC, AG-AJ and AL therein, 2 pages.
Sato, H., et al., "Prevention of esophageal stricture after endoscopic submucosal dissection using RNA-based silencing of carbohydrate sulfo-transferase 15 in a porcine model", Endoscopy, vol. 49, 2017, pp. 491-497.
Siersema, P., "Treatment option for esophageal strictures", Nature Gastroenterology Hepatology, vol. 5, No. 3, 2008, pp. 142-152.
Kitagawa, Y., et al., "Esophageal cancer practice guidelines 2017 edited by the Japan Esophageal Society: part 1", Esophagus, vol. 16, 2019, pp. 1-24.
Sami, S.S., et al., "UK guidelines on esophageal dilatation in clinical practice", Gut, vol. 67, 2018, pp. 1000-1023.
Draganov, P.V., et al., "AGA Institute Clinical Practice Update: Endoscopic Submucosal Dissection in the United States", Clinical Gastroenterology and Hepatology, vol. 17, No. 1, 2019, pp. 16-25 (11 total pages).
Barret, M., et al., "Systematic review: the prevention of oesophageal stricture after endoscopic resection", Aliment Pharmacology Therapeutics, vol. 42, 2015, pp. 20-39.
Jain, D., et al., "Esophageal Stricture Prevention after Endoscopic Submucosal Dissection", Clinical Endoscopy, vol. 49, 2016, pp. 241-256.
Hashimoto, S., et al., "The efficacy of endoscopic triamcinolone injection for the prevention of esophageal stricture after endoscopic submucosal dissection", Gastrointestinal Endoscopy, vol. 74, No. 6, 2011, pp. 1389-1393.
Yamashita, S., et al., "Inadequate steroid injection after esophageal ESD might cause mural necrosis", Endoscopy International Open, vol. 7, 2019, pp. E115-E121.
Ohtake, S., et al., "Expression of sulfotransferase involved in the biosynthesis of chondroitin sulfate E in the bone marrow derived mast cells" Biochemical Biophysica Acta, vol. 1780, 2008, pp. 687-695.
Habuchi, O., et al., "Enzymatic synthesis of chondroitin sulfate E by N-acetylgalactosamine 4-sulfate 6-O-sulfotransferase purified from squid cartilage", Analytical Biochemistry, vol. 310, 2002, pp. 129-136.
Kvist, A.J., et al., "Chondroitin Sulfate Perlecan Enhances Collagen Fibril Formation", The Journal of Biological Chemistry, vol. 281, No. 44, 2006, pp. 33127-33139.
Yamada, S., et al., "Potential Therapeutic Application of Chondroitin Sulfate/Dermatan Sulfate", *Current Drug Discovery Technologies*, vol. 5, 2008, pp. 289-301.
Mizumoto, S., et al., "Glycosaminoglycans are functional ligands for advanced glycation end-products in tumors", FEBS Journal, vol. 280, 2013, pp. 2462-2470.
Sato, H., et al., "Prevention of esophageal stricture after endoscopic submucosal dissection using RNA-based silencing of carbohydrate sulfotransferase 15 in a pig model", Endoscopy, vol. 49, 2017, pp. 1-9.
Extended European Search Report issued Oct. 14, 2022, in corresponding European Patent Application No. 19928159.3 citing documents 24 and 25 therein, 12 pages.
Kenji Suzuki et al., "Pivotal Role of Carbohydrate Sulfotransferase 15 in Fibrosis and Mucosal Healing in Mouse Colitis", PLOS ONE, vol. 11, No. 7, XP055470858, Jul. 13, 2016, p. e0158967, pp. 1-17.

(Continued)

*Primary Examiner* — Amy Rose Hudson

(74) *Attorney, Agent, or Firm* — Oblon, McClelland, Maier & Neustadt, L.L.P.

(57) ABSTRACT

The present invention relates to a novel esophageal stricture suppressing agent comprising CHST15 siRNA as an effective ingredient.

5 Claims, 4 Drawing Sheets

Specification includes a Sequence Listing.

(56) References Cited

OTHER PUBLICATIONS

Yoshiro Kai et al., "Silencing of Carbohydrate Sulfotransferase 15 Hinders Murine Pulmonary Fibrosis Development", Molecular Therapy-Nucleic Acids, vol. 6, XP055637205, Mar. 2017, pp. 163-172.

Chinese Office Action issued Nov. 22, 2024, in corresponding Chinese Patent Application No. 201980096182.8 (with English Translation), citing document 24 therein, 10 pages.

Xiang Ping et al., "Early Gastrointestinal Cancer, Endoscopic Diagnosis and Treatment", Item Editor, Shanghai Technical Press, Jan. 2019, 1st Edition, pp. 92-93.

Report of Research progress promoted by Niigata University Project in 2012 (Preliminary summary) with English Translation (5 pages).

Chinese Supplemental Search Report dated Apr. 21, 2025, in Chinese Patent Application No. 2019800961828 (3 pages).

Hisanori Kiryu et al., "A detailed investigation of accessibilities around target sites of siRNAs and miRNAs", Bioinformatics, vol. 27 No. 13 2011, pp. 1788-1797 (10 pages).

* cited by examiner

ESOPHAGEAL STRICTURE SUPPRESSING AGENT

CROSS-REFERENCE TO RELATED APPLICATIONS

The present application is a 35 U.S.C. § 371 national stage patent application of International patent application PCT/JP2019/018365, filed on May 8, 2019. The entire contents of this application are incorporated herein by reference.

TECHNICAL FIELD

The present invention relates to a novel esophageal stricture suppressing agent containing CHST15 siRNA as an effective ingredient.

BACKGROUND ART

Endoscopic therapy of esophageal cancer, which is minimally invasive to esophageal cancer or Barrett's esophagus and enables preservation and maintenance of esophageal function, has recently become established as a curative treatment for esophageal superficial cancer or Barrett's esophagus (Documents 1 to 5). In particular, progress of technology in endoscopic submucosal dissection (ESD) is remarkable, and it has been established as a new treatment method that can be a radical treatment method even for a wide range of lesions. However, cicatricial stricture occurs at a high rate after ESD, so that a patient may not only have dysphagia due to stricture but also undergo a surgical operation due to stricture, and even though the cancer has been eradicated, the subsequent QOL is significantly inhibited. Therefore, suppression of stricture (prevention and treatment) after ESD has conversely become a newly generated clinical problem accompanied with the progress of the endoscopic therapy technology (Documents 1 to 6). With regard to onset of stricture, it has become clear that it depends on the extent of esophageal mucosal resection, in particular, there has been accumulated an evidence that the extent of resection is ¾ circumference, that is, 75% or more or less, is an extremely critical point (Documents 2 and 4). That is, when ESD is performed in the range of ¾ circumference or more, postoperative esophageal stricture is inevitable, so that it becoming clear that separate clinical treatments are required for ¾ circumference or more and less.

As strategy for suppressing stricture after esophageal ESD, it has been considered protection of esophageal mucosa against reflux of gastric acid, anti-inflammatory, antifibrosis, promoting mucosa regeneration and mechanical dilatation, and attempts have been made for proton pump inhibitors (esophageal mucosa protection), steroid preparations (anti-inflammatory), cell sheet (promoting regeneration), endoscopic balloon dilatation (mechanical dilatation), esophageal stents (mechanical dilatation) and the like, but it is still difficult to control the condition of a disease (Documents 5 and 6). Although balloon dilatation involves pain and risk of esophageal rupture, the current situation is that there is no choice but to implement it, and second-time stricture and third-time stricture occur at a high rate so that dilatation is often required repeatedly, whereby it is refractory for several months, and QOL is significantly impaired.

Thus, in recent years, local injection of steroids is now being performed (Documents 6 and 7). This is to inject a steroid solution endoscopically into the ulcer part after ESD with a local injection needle immediately after performing ESD, and it is said to be safer when compared with balloon dilatation. However, it has been reported that steroids not only carry the risk of infection including abscess formation but also induce delayed esophageal perforation by local administration (Documents 2 to 6 and 8). To damage the muscular layer is the cause so that it is required to carefully administer by avoiding the muscular layer after ESD, but it is anatomically difficult to administer by avoiding the muscular layer at the time of injection into the huge artificial ulcer portion associated with a wide range ESD, and there is always a risk of perforation. More decisively, there is a report that it has a certain effect on stricture after ESD of a relatively small range of ¾ circumference or less, but it has been clarified that there is no effect on a wide range of stricture after ESD of ¾ circumference or more (Documents 2 to 6). Therefore, with regard to stricture after ESD of ¾ circumference or more, there is no drug therapy including steroids, and it is the present status that mechanical dilatation such as balloon dilatation, stent, and the like, must necessarily be done. On the other hand, not only esophageal cancer but also Barrett's esophagus, which has been particularly increasing in recent years, there are many cases where lesions exhibit in a wide range of ¾ circumference or more or entire circumference so that it is required to carry out a wide range of endoscopic therapy and ESD treatment of ¾ circumference or more.

Also, the fact that esophageal stricture after ESD is completely different from cancerous stricture and is benign stricture after the cancer has been completely cured is extremely important in clinical practice. Benign stricture is one that should be avoided as much as possible from stents that prevent progressive esophageal stricture with makeshift due to unresectable and growing cancer, and furthermore, from iatrogenic risk that induces perforation due to muscular layer destruction or mediastinal abscess. That is, a treatment with extremely high hurdles to ensure high safety as well as the stricture suppressing effect is required in actual clinical practice. Therefore, how to safely suppress the esophageal stricture that necessarily occurs after a wide range of ESD as mentioned above is an urgent clinical issue including development of new drugs.

CHST15 (Carbohydrate sulfotransferase 15), which is a sugar sulfate transferase, is a type II transmembrane Golgi protein which transfers a sulfate group to the 6-position of GalNAc ($4SO_4$) residue of chondroitin sulfate A (CS-A) to synthesize highly sulfated chondroitin sulfate E (CS-E) (Documents 9 and 10). It is rarely expressed in normal human tissue, but it has been known that its expression is enhanced in inflammation, fibrosis and cancer. It has been reported that CS-E promotes collagen fiber (fibril) formation (Document 11), and CS-E is considered to be involved in maintenance and enhancement of local fibrotic lesion. Further, it has been reported that highly sulfated CS binds to the molecule CD44 involved in adhesion of fibroblast, chemokines MCP-1 and SDF-1 involved in migration of fibroblast, PDGF and TGF-I3 involved in proliferation of fibroblast (Documents 12 and 13), and it is suggested that it involves in fixation and activation of fibroblast through condensation of these molecules in the lesion local area.

In the esophagus, it has been reported that in a half circumferential type (50%) porcine ESD model, mRNA of CHST15 is increased in stricture esophageal tissue after ESD, and when expression of mRNA is suppressed by CHST15 siRNA, then, fibrosis is suppressed (Document 14), so that it has been suggested that it has a possibility to have a stricture suppressing effect after ESD of ¾ circumference or less similarly to steroids. However, as clearly described as limitation in Non-Patent Document 14, it is unclear whether or not it can suppress stricture after ESD of ¾ circumference or more, and further entire circumference. Similarly to the fact that steroids are ineffective for stricture of ¾ circumference or more, it is significantly high hurdle to show a suppressing effect on stricture of ¾ circumference or more, even more entire circumference, so that it is difficult to predict. Also, in Non-Patent Document 14, ESD is prepared at the two portions in the same individual, CHST15 siRNA is administered to one portion and negative control siRNA is administered to the other portion, and the effects of narrowing lesions exhibited at the negative control siRNA-administered portion provided on clinical symptoms were mixed, so that it was quite unclear how CHST15 siRNA affects clinical symptoms (body weight loss due to dysphagia, and the like).

PRIOR ART DOCUMENT

Non-Patent Documents

1) Siersema P D. Treatment option for esophageal strictures. Nature Gastroenterol Hepatol 5: 142-152, 2008.
2) Japan Esophageal Society, Esophageal cancer clinical practice guidelines, Edited 2017.
3) Sami S S, Haboubi N, Ang Y et al. U K guidelines on esophageal dilatation in clinical practice. Gut 67: 1000-1023, 2018.
4) Draganov P V, Wang A Y, Othman M O et al. AGA institute clinical practice update: Endoscopic submucosal dissection in the united states. Clin Gastroenterol Hepatol 17: 16-25, 2019.
5) Barret M<Beye S, Leblanc S et al. Systematic review: the prevention of oesophageal stricture after endoscopic resection. Aliment Pharmacol Ther 42: 20-39, 2015.
6) Jain D, Singhal S. Esophageal stricture prevention after endoscopic submucosal dissection. Clin Endosc 49: 241-256, 2016.
7) Hashimoto S, Kobayashi M, Takeuchi M, et al. The efficacy of endoscopic triamcinolone injection for the prevention of esophageal stricture after endoscopic submucosal dissection. Gastrointest Endosc 74: 1389-1393, 2011.
8) Yamashita S, Kato M, Fujimoto A, et al. Inadequate steroid injection after esophageal ESD might cause mural necrosis. Endosc int Open 7: E115-E121. 2019.
9) Ohtake S, Kondo S, Morisaki T, et al. Expression of sulfotransferase involved in the biosynthesis of chondroitin sulfate E in the bone marrow derived mast cells. Biochemical Biophysica Acta 1780: 687-95, 2008.
10) Habuchi O, Moroi R, Ohtake S, et al. Enzymatic synthesis of chondroitin sulfate E by N-acetylgalactosamine 4-sulfate 6-O-sulfotransferase purified from squid cartilage. Anal Biochem 310: 129-36, 2002.
11) Kvist A J, Hohnson A E, Morgelin M et al. Chondroitin sulfate perlecan enhances collagen fibril formation. JBC 281: 33127-33139, 2006.
12) Yamada S and Sugahara K. Potential therapeutic Application of chondroitin sulfate/dermatan sulfate. Current Drug Discovery Technologies 5: 289-301, 2008.
13) Mizumoto S and Sugahara K. Glycosaminoglycans are functional ligands for advanced glycation end-products in tumors. FEBS Journal 280: 2462-2470, 2013.
14) Sato H, Sagara S, Nakajima N, et al. Prevention of esophageal stricture after endoscopic submucosal dissection using RNA-based silencing of carbohydrate sulfotransferse 15 in a pig model. Endoscopy 49: 1-9, 2017.

SUMMARY OF THE INVENTION

Problems to be Solved by the Invention

An object of the present invention is to provide a safe novel stricture suppressing agent for benign esophageal stricture.

Means to Solve the Problems

The present inventors have found a stricture suppressing effect that could not be predicted from the treatment by the prior art, by investigating an effect of local administration of CHST15 siRNA using an entire circumference (100%) ESD model. Also, it was clarified that the effects are due to quite different effects that are not only based on the anti-fibrotic effect of CHST15 siRNA, but also appearance of mature epithelium and substantially complete protection of muscular layer. It was found that it was a drug that has a stricture suppressing effect on entire circumference ESD, which has been extremely difficult, and there was no risk of perforation or mediastinal abscess accompanied with muscular layer destruction and exhibited an extremely excellent effect in the aspect of safety of clinical practice, whereby it was expected to be applied to the treatment of benign esophageal stricture associated with wide-range endoscopic therapy.

The present inventors have found that a remarkable stricture suppressing effect can be obtained by administering CHST15 siRNA alone in esophageal stricture after porcine esophageal entire circumference (100%) ESD, which is a level at which a known drug therapy including steroids cannot exert an effective effect. Further, the present inventor has found that the effect is accompanied by a muscular layer protective action, and has also discovered that the risk of muscular layer destruction associated with known steroid preparations and mechanical expansion can be avoided. It was demonstrated that CHST15 siRNA has high safety and a remarkable stricture suppressing effect at the same time in benign esophageal stricture after entire circumference ESD, for which there was conventionally no symptomatic method other than mechanical dilatation.

More specifically, the present invention provides the following [1] to [8].

[1] A pharmaceutical composition for treating or preventing benign esophageal stricture, which comprises siRNA that suppresses expression of a CHST15 gene as an effective ingredient.
[2] The pharmaceutical composition of [1], wherein the esophageal stricture is stenosis selected from the group consisting of achalasia stenosis, digestive stenosis, Schatzki ring, endoscopic treatment stenosis, eosinophil esophagitis stenosis, postoperative stenosis, radiation therapy stenosis, corrosive stenosis and intractable stenosis.
[3] The pharmaceutical composition of [1] or [2], wherein esophageal stricture is generated in ¾ circumference or more of esophagus.
[4] The pharmaceutical composition of any one of [1] to [3], which is not accompanied by muscular layer damage of the esophagus.
[5] The pharmaceutical composition of any one of [1] to [4], which is not used in combination with a steroid.
[6] The pharmaceutical composition of any one of [1] to [5], wherein endoscopic balloon dilatation is not used in combination or a number of times of endoscopic balloon dilatation in combination is reduced.

[7] The pharmaceutical composition of any one of [1] to [6], wherein siRNA is contained at 100 to 10,000 nM.

[8] The pharmaceutical composition of any one of [1] to [7], which is administered as a single dose or at an interval of a week.

The present invention further relates to the following.

[A-1] A method for treating esophageal stricture, which comprises a step of administering siRNA that suppresses expression of a CHST15 gene.

[B-1] An siRNA for suppressing expression of a CHST15 gene for use in a treatment of esophageal stricture.

[C-1] Use of siRNA for suppressing expression of a CHST15 gene in the manufacture of an esophageal stricture suppressing agent.

[D-1] A method for producing an esophageal stricture suppressing agent, which comprises a step of using siRNA that suppresses expression of a CHST15 gene.

Effects of the Invention

Since ¾ circumference or more of the esophagus, in particular, extremely potent stricture is exhibited after entire circumference ESD, it has not been known any drug that suppresses it until now, but surprisingly, it was firstly clarified by the present invention that a stricture suppressing effect can be obtained by locally administering CHST15 siRNA. CHST15 siRNA has been known to have an antifibrotic effect limited to the submucosal layer, but it is firstly clarified by the present invention that it has a use of a muscular layer (unique muscular layer) protection which is different from fibrosis. Thus, it is provided an effective and safe novel treatment method for esophageal stricture, which was impossible to treat by the conventional drug therapy.

EMBODIMENTS OF THE INVENTION

Figure 1:
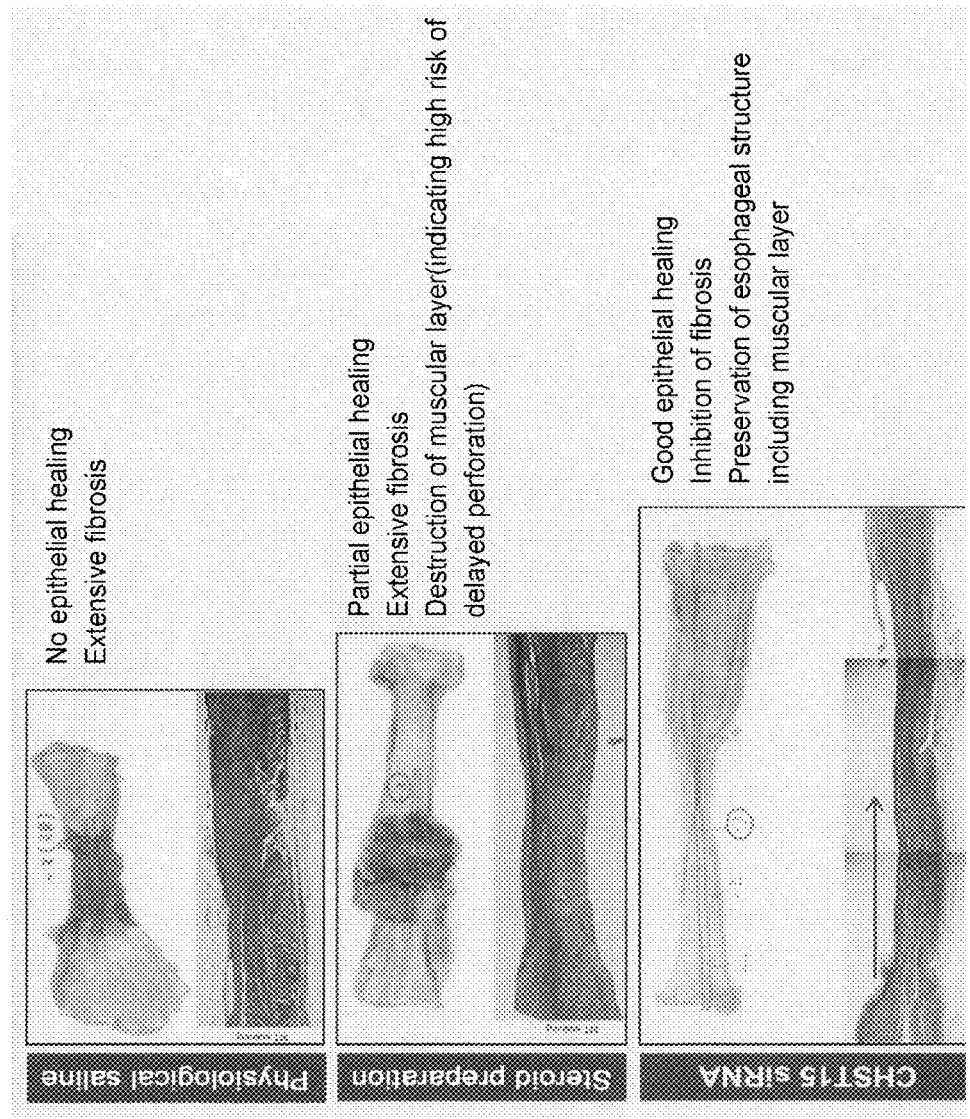
FIG. 1 is a macrographic image and a Masson stained image of the whole esophageal isolated preparation showing esophageal stricture in a porcine entire circumference ESD model. Immediately after subjecting to ESD, and after locally injecting physiological saline (upper), steroid preparation and Kenacort (middle), and CHST15 siRNA (lower), they were slaughtered on 14$^{th}$ day (Day 14).
Figure 2:
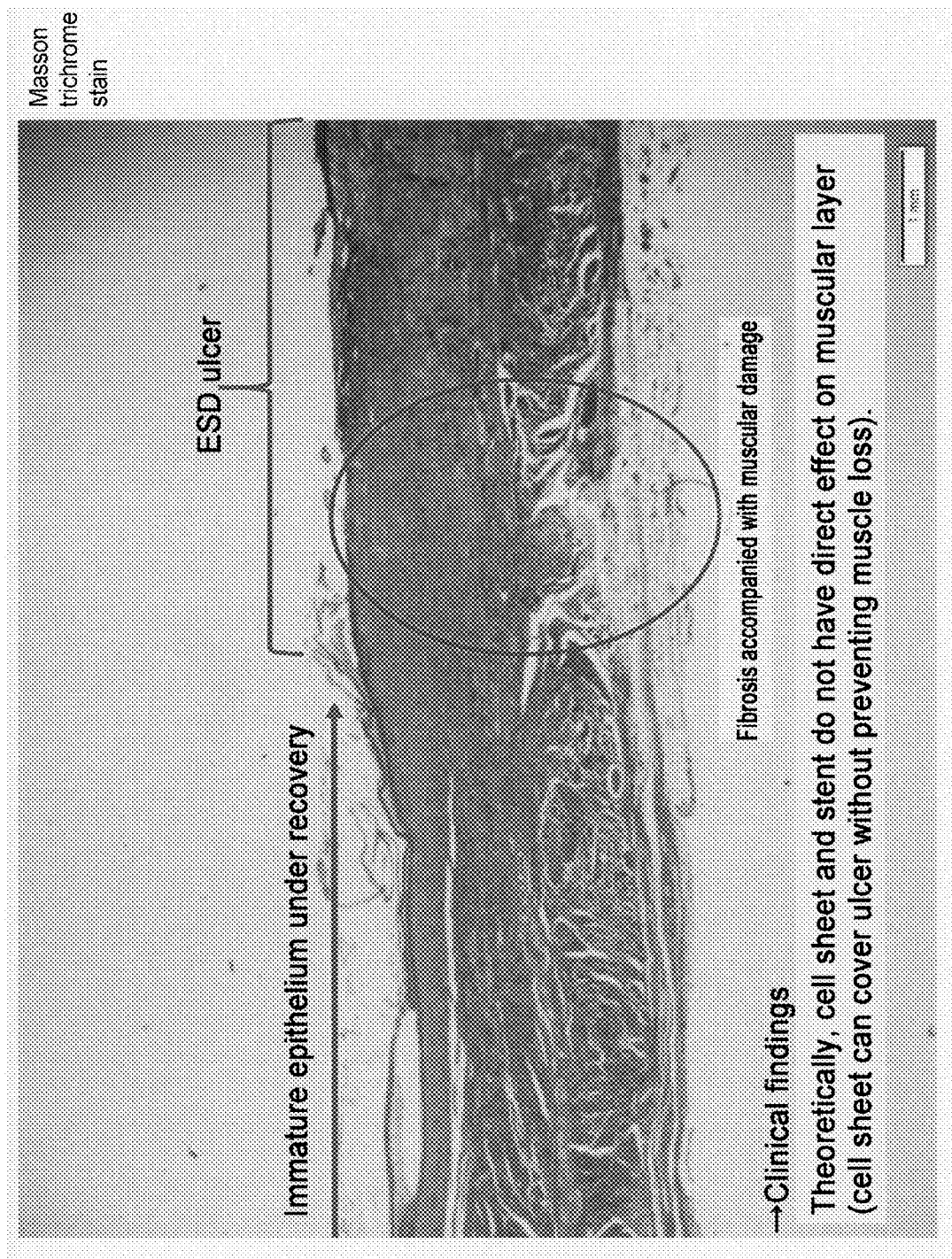
FIG. 2 is, similar to the upper part of FIG. 1, an enlargement of a Masson stained image showing an effect of physiological saline exerted on esophageal stricture after entire circumference ESD.
Figure 3:
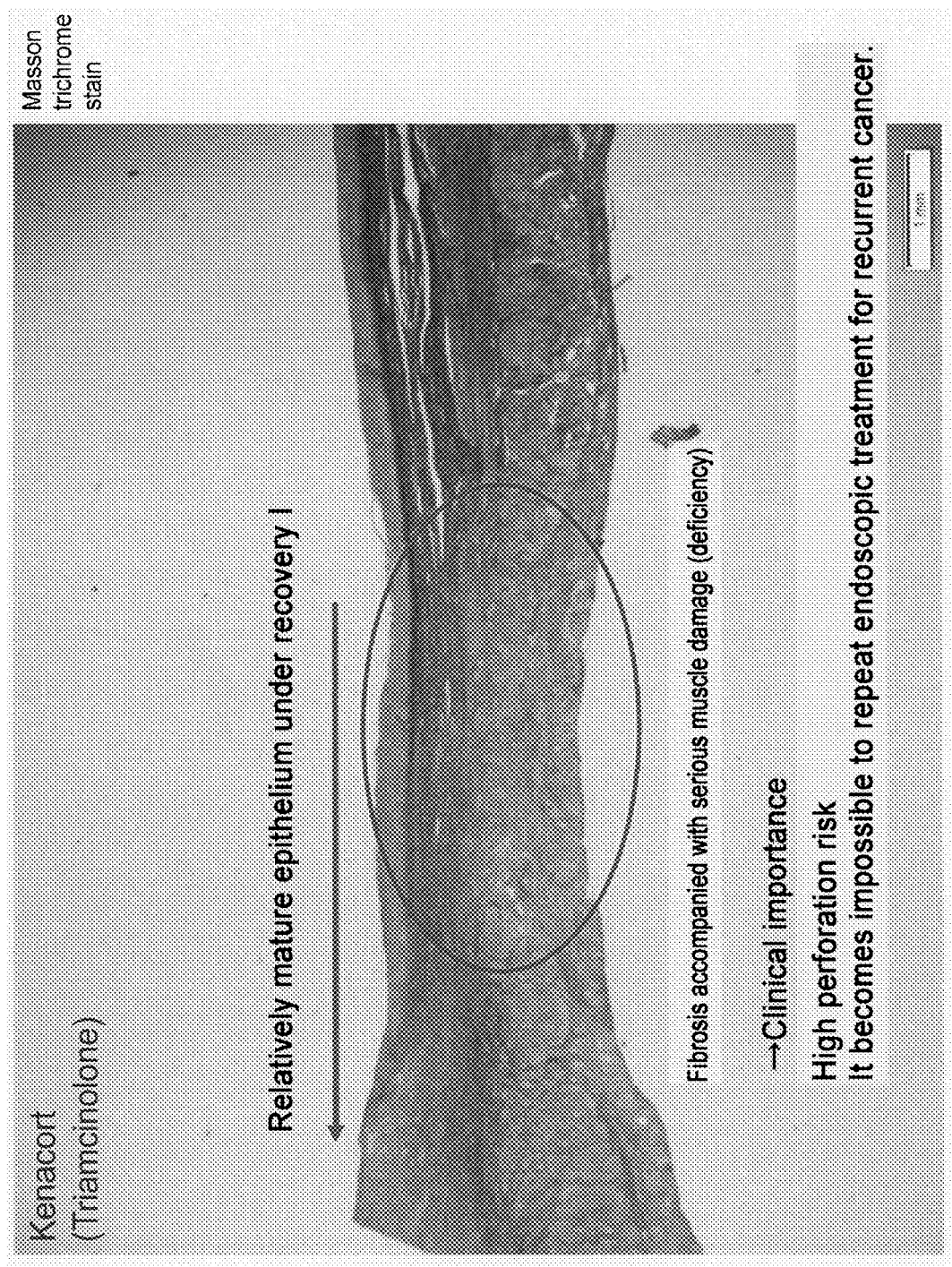
FIG. 3 is, similar to the middle part of FIG. 1, an enlargement of a Masson stained image showing an effect of a steroid preparation (Kenacort) exerted on esophageal stricture after entire circumference ESD.
Figure 4:
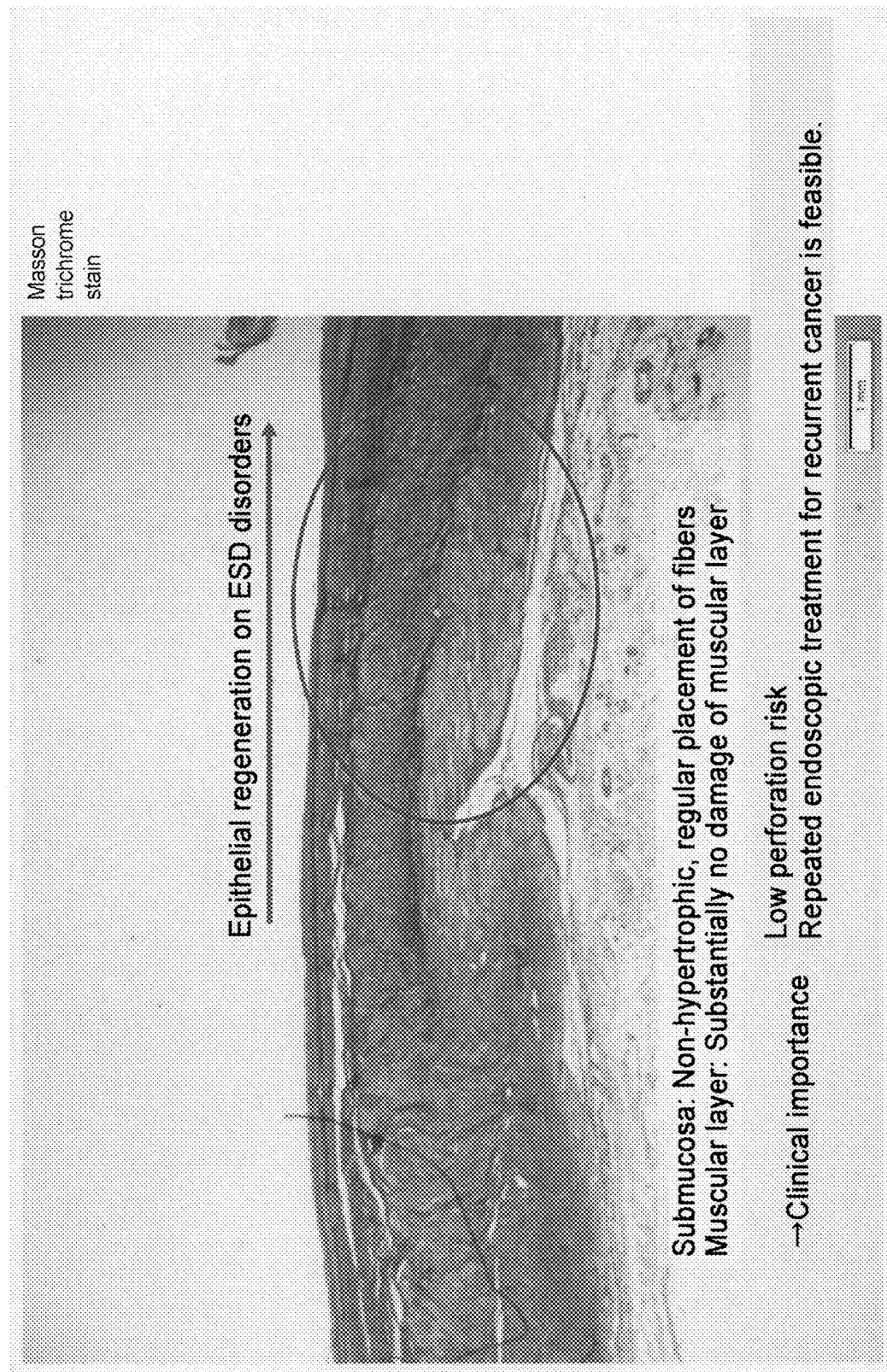
FIG. 4 is, similar to the lower part of FIG. 1, an enlargement of a Masson stained image showing an effect of CHST15 siRNA exerted on esophageal stricture after entire circumference ESD.

Hereinafter, the present invention will be explained in detail.

The present inventor has found that by suppressing expression of a CHST15 (Carbohydrate sulfotransferase 15) gene, a suppressing effect on esophageal stricture after esophageal entire circumference ESD is exhibited. More specifically, the present inventor has found that esophageal stricture is suppressed by suppressing expression of the CHST15 gene by an RNAi (RNA interference) effect. Further, the present inventor has found that stricture is significantly suppressed by siRNA that suppresses expression of the CHST15 gene even for esophageal stricture after entire circumference ESD at a level where no significant therapeutic effect is observed with the existing steroid preparations, and the effect is safely exerted by the muscular layer protective action.

The CHST15 gene of the present invention is not particularly limited, and is generally derived from animals, more preferably derived from mammals, and most preferably derived from humans. Incidentally, the CHST15 of the present invention is also called GalNAc4S-6ST (N-acetylgalactosamine 4-sulfate 6-0 sulfotransferase) as another name.

The sequence of the CHST15 (GalNAc4S-6ST) of the present invention can be obtained, for example, based on an accession number NM 015892. As an example, the base sequence of the CHST15 gene of the present invention is described in SEQ ID NO:3, and the amino acid sequence coded by the gene is described in SEQ ID NO:4. Even in a protein consisting of an amino acid sequence other than the above-mentioned, for example, a protein having high identity (generally 70% or more, preferably 80% or more, more preferably 90% or more, and most preferably 95% or more) with the sequence described in SEQ ID NO:4, and has the function which is possessed by the above-mentioned protein is included in the CHST15 protein of the present invention. The above-mentioned protein is, for example, a protein consisting of an amino acid sequence in which one or more amino acids is/are added, deleted, substituted or inserted in the amino acid sequence described in SEQ ID NO:4, and generally a number of the amino acids to be changed is within 30 amino acids, preferably within 10 amino acids, more preferably within 5 amino acids, and most preferably within 3 amino acids.

In the above-mentioned gene in the present invention, for example, an endogenous gene (homologue of the above-mentioned gene of human, and the like) in the other organisms corresponding to DNA consisting of the base sequence described in SEQ ID NO:3 is included. In addition, the endogenous DNAs of the other organisms corresponding to the DNAs consisting of the base sequence described in SEQ ID NO:3 generally have high identity (homology) with the DNAs described in SEQ ID NO:3, respectively. High identity means homology of preferably 70% or more, further preferably 80% or more, more preferably 90% or more (for example, 95% or more, further 96%, 97%, 98% or 99% or more). This homology can be determined by the mBLAST algorithm (Altschul et al. (1990) Proc. Natl. Acad. Sci. USA 87: 2264-8; Karlin and Altschul (1993) Proc. Natl. Acad. Sci. USA 90: 5873-7). Also, when the DNA is isolated from a living body, it is considered to be hybridized with the DNA described in SEQ ID NO:3, respectively, under stringent conditions. Here, "stringent conditions" may be mentioned, for example, "2×SSC, 0.1% SDS, 50° C.", "2×SSC, 0.1% SDS, 42° C." and "1×SSC, 0.1% SDS, 37° C.", and as the more stringent conditions, "2×SSC, 0.1% SDS, 65° C.", "0.5×SSC, 0.1% SDS, 42° C." and "0.2×SSC, 0.1% SDS, 65° C." can be mentioned.

In the present specification, the "siRNA which suppresses expression of the CHST15 gene" can be also expressed as "CHST15 siRNA", and preferably it is siRNA of the structure in which RNAs described in SEQ ID NO:1 (5'-ggagcagagc aagaugaaua caaucag-3') and SEQ ID NO2 (5'-gauuguauuc aucuugcucu gcuccau-3') are hybridized.

In the siRNA of the present invention, it is not necessary required that all nucleotides are ribonucleotides (RNA). That is, in the present invention, one or a plural number of ribonucleotides that constitute siRNA may be corresponding deoxyribonucleotides as long as the molecule itself has a function of suppressing expression of the CHST15 gene. This "corresponding" refers to the same base species (adenine, guanine, cytosine, thymine (uracil)) although the structure of the sugar moiety is different. For example, the deoxyribonucleotides corresponding the ribonucleotides having adenine refers to the deoxyribonucleotides having adenine. Also, the above-mentioned "plural number" is not particularly limited, and preferably refers to a small number of about 2 to 5.

The siRNA of the present invention can be appropriately produced by those skilled in the art using a commercially available nucleic acid synthesizer. Also, for the synthesis of desired RNA, it is possible to use a general synthetic contract service.

The CHST15 siRNA of the present invention has a suppressing effect on benign esophageal stricture with a single agent, so that the present invention is to provide an esophageal stricture suppressing agent (a pharmaceutical composition for treating or preventing benign esophageal stricture) containing CHST15 siRNA as an effective ingredient. Or else, the present invention is to provide a method for treating benign esophageal stricture which comprises a step of administering CHST15 siRNA, CHST15 siRNA for use in the treatment of benign esophageal stricture, use of CHST15 siRNA for the manufacture of an esophageal stricture suppressing agent, and a method for producing an esophageal stricture suppressing agent which comprises a step of using CHST15 siRNA (formulating and/or mixing with a pharmaceutically or physiologically acceptable carrier).

In the present invention, the esophageal stricture which is an object of the treatment or prevention is not specifically limited as long as it is a benign esophageal stricture in which the anti-CHST15 siRNA of the present invention exerts a therapeutic effect, and it is stenosis selected from the group consisting of achalasia stenosis, digestive stenosis, Schatzki ring, endoscopic treatment stenosis, eosinophil esophagitis stenosis, postoperative stenosis, radiation therapy stenosis, corrosive stenosis and intractable stenosis, and preferably an esophageal stricture after wide range esophageal ESD of ¾ circumference or more. Incidentally, the "treatment" in the present invention is not necessarily limited to the case of having a complete therapeutic effect, and may be a case of having a partial effect.

The esophageal stricture suppressing agent or the pharmaceutical composition of the present invention is mixed with a pharmaceutically or physiologically acceptable carrier, an excipient, or a diluent, etc., and can be administered orally or parenterally. As the oral preparation, it can be made a dosage form such as a granule, a powder, a tablet, a capsule, a solution, an emulsion, or a suspension, etc. As the parenteral preparation, it can be selected a dosage form such as an injection, a drip, an external preparation, an inhalant (nebulizer) or a suppository, etc. As the injection, it can be shown a subcutaneous injection, an intramuscular injection, an intraperitoneal injection, an intracranial administration injection, or an intranasal injection, etc. As the external preparation, it can be shown a nasal administration agent, or an ointment, etc. The formulation technology to make the above-mentioned dosage form is known so as to contain the anticancer agent or the pharmaceutical composition of the present invention which is the main component.

For example, the tablet for oral administration can be produced by adding an excipient, a disintegrant, a binder, and a lubricant, etc., to the esophageal stricture suppressing agent or the pharmaceutical composition of the present invention, mixing them, and compressing and shaping them. As the excipient, lactose, starch, or mannitol, etc., is generally used. As the disintegrant, calcium carbonate, or carboxymethyl cellulose calcium, etc., is generally used. As the binder, gum arabic, carboxymethyl cellulose, or polyvinylpyrrolidone is used. As the lubricant, talc or magnesium stearate, etc., is known.

The tablet containing the esophageal stricture suppressing agent or the pharmaceutical composition of the present invention can be coated with a known coating for masking or making an enteric preparation. As the coating agent, ethyl cellulose, polyoxyethylene glycol, or the like can be used.

Also, the injection can be obtained by dissolving the esophageal stricture suppressing agent or the pharmaceutical composition of the present invention, which is a main component, together with an appropriate dispersant, dissolving or dispersing the same in a dispersing medium. By the selection of the dispersing medium, it can be made either of the dosage form of an aqueous solution or an oily solution. To make the aqueous solution, distilled water, physiological saline, or Ringer's solution, etc., is used as the dispersing medium. In the oily solution, various kinds of vegetable oils or propylene glycol, etc., is utilized as the dispersing medium. At this time, a preservative such as paraben, etc., can be added, if necessary. Also, to the injection, a known tonicity agent such as sodium chloride, glucose, etc., can be added. Further, an analgesic such as benzalkonium chloride, procaine hydrochloride can be added.

In addition, the esophageal stricture suppressing agent or the pharmaceutical composition of the present invention can be used as an external preparation by making it a solid, liquid, or semi-solid composition. As for the solid, or liquid composition, it can be made an external preparation by making the same composition as mentioned previously. The semi-solid composition can be prepared by adding a thickener to an appropriate solvent, if necessary. As the solvent, water, ethyl alcohol, or polyethylene glycol, etc., can be used. As the thickener, bentonite, polyvinyl alcohol, acrylic acid, methacrylic acid, or polyvinylpyrrolidone, etc., is generally used. To the composition, a preservative such as benzalkonium chloride, etc., can be added. Also, by combining an oil-base base material such as cacao butter or an aqueous gel base material such as a cellulose derivative, it can be made a suppository.

When the esophageal stricture suppressing agent or the pharmaceutical composition of the present invention is used as a gene therapy agent, there may be mentioned a method, in addition to the method in which the esophageal stricture suppressing agent or the pharmaceutical composition of the present invention is directly administered by injection, in which a vector into which a nucleic acid has been incorporated is administered. As the above-mentioned vector, there may be mentioned an adenovirus vector, an adeno-associated virus vector, a herpesvirus vector, a vaccinia virus vector, a retrovirus vector, a lentiviral vector, and the like, and by using these viral vectors, it can be administered more efficiently.

In addition, it is also possible that the esophageal stricture suppressing agent or the pharmaceutical composition of the present invention is introduced into phospholipid endoplasmic reticulum such as liposomes and the endoplasmic reticulum can be administered. Endoplasmic reticulum to which siRNA is retained is introduced into a predetermined cell by the lipofection method. And the obtained cells are systemically administered into, for example, vein, artery, or the like.

Also, the present invention provides a method for treating or preventing esophageal stricture in a subject, which comprises the step of administering the esophageal stricture suppressing agent or the pharmaceutical composition of the present invention to an individual (for example, a patient) or its esophageal tissue. The individual to be treated or prevented by the method of the present invention is not particularly limited as long as it is an organism capable of developing esophageal stricture, and is preferably a human. Administration to a subject can be performed by a method known to those skilled in the art, for example, oral administration, intradermal administration, or subcutaneous administration, intravenous injection or the like. It is possible to carry out systemic administration, or local administration directly into the esophageal tissue. In addition, in order to introduce the siRNA of the present invention into a target tissue or organ, a commercially available gene introduction kit can be used.

The esophageal stricture suppressing agent or the pharmaceutical composition of the present invention is administered in a required amount (effective amount) to a mammalian subject including humans within a range of a dose which is considered to be safe. The dose of the esophageal stricture suppressing agent or the pharmaceutical composition of the present invention can be finally appropriately determined by the judgement of those skilled in the art (doctor or veterinarian) in consideration of a kind of dosage, administration method, age and body weight of the subject, symptoms of the subject, and the like. When an example is shown, it may vary depending on age, sex, symptoms, administration route, number of administrations, and dosage form, and it may be administered, for example, with the dose by local administration of the CHST15 siRNA of the present invention of about 100 to 10,000 nM once per day, single time administration or 1 week interval to 1 month interval (for example, 1 week interval, 2 week interval or 1 month interval).

Incidentally, all prior art references cited in the present specification are incorporated into the present specification by reference.

EXAMPLES

Hereinafter, the present invention will be explained in more detail by referring to Examples. However, the technical scope of the present invention is not limited to these Examples.

Incidentally, "CHST15 siRNA" used in the present Example is an siRNA having a structure in which the RNAs described in SEQ ID NOs:1 and 2 are hybridized.

Example 1

For the production of an esophageal entire circumference (100%) ESD model, miniature pigs for experiments were used. In mice and rats, which are widely used as experimental animals, there is no stratified squamous epithelium as in humans anatomically, and physiological reflux does not occur, so that it is difficult to reflect the factors involved in the important pathophysiology of human esophageal diseases. On the other hand, the esophagus of a miniature pig having a body weight of 40 kg has a total length of about 30 cm, which is comparable to the esophageal length of a human adult of about 40 cm, has stratified squamous epithelium like humans and physiological reflux also occurs, and there is an advantage that ESD experiments using an upper gastrointestinal endoscopic set of humans.

As miniature pigs, three groups of a physiological saline administered group, a steroid preparation (Kenacort) administered group, and a CHST15 siRNA (manufactured by Hokkaido System Science Co., Ltd., lot number: 40481638) administered group were used (n=1/group). The miniature pig in each group was orally inserted with an upper gastrointestinal endoscope under general anesthesia and respiratory control, and an entire circumference (100%) ESD was performed using a dual knife with a total length of 5 cm between 15 cm and 25 cm from the portal dentition. Into an entire circumference artificial ulcer immediately after preforming ESD was injected 2 mL in total of an administration solution (physiological saline, steroid preparation, CHST15 siRNA, 250 nM solution) using an endoscopic injection needle at a total of 20 locations so as to evenly cover the entire circumference from the ulcer bottom.

If no treatment is performed after ESD, esophageal stricture will develop within 2 weeks and food will not pass through, and the miniature pig will die within 4 weeks thereafter, so that the observation period after a single time administration was set to 2 weeks, the entire group was slaughtered after 2 weeks (Day 14), and the degree of esophageal stricture was investigated by macroscopical findings, and histopathological analysis (Masson staining).

Results:
Physiological Saline Administered Group:
<Macroscopical Findings>
Shortening of esophageal length and complete obstruction were observed. It was in the state of not edible.
<Pathological Findings>
Although some immature regenerated epithelium was observed, artificial ulcer due to ESD remained, and extensive fibrosis deeper than the ulcer floor and crush injury of the muscular layer were observed.
Steroid Preparation (Kenacort) Administered Group:
<Macroscopical Findings>
Although the degree of shortening of esophageal length was a slight degree as compared with that of the physiological saline administered group, complete obstruction was observed. It was in the state of not edible.
<Pathological Findings>
Although artificial ulcer due to ESD remained, as compared with the physiological saline administered group, repair findings due to relatively mature regenerated epithelium were observed. However, extensive fibrosis was observed in all layers deeper than that, and the degree thereof was stronger than that in the physiological saline administered group. In addition, extensive muscular layer destruction accompanied by defects was observed, and fibrosis extended to the serosal layer.
CHST15 siRNA Administered Group:
<Macroscopical Findings>
There was substantially not observed in shortage of esophageal length, and although narrowing of part of lumens was observed, there was no stricture or obstruction, and it was in the state of edible.
<Pathological Findings>
The artificial ulcer due to ESD was almost covered with regenerated epithelium, and the stratified squamous epithelium was regularly constructed and was a more mature regenerated epithelium as compared with the steroid administered group. There was no pathological fibrosis deeper than that, it was the fibers at substantially physiological levels supporting the epithelium. Further, no damage of the muscular layer was observed.

Consideration:

In the steroid preparation administered group, there was no suppressing effect of esophageal stricture after entire circumference ESD, which was considered to be the same result as in the clinical trial. As compared with the physiological saline administered group, whereas a tendency of shrinkage of the ulcer floor accompanied with regenerated epithelium was observed, extensive damage of the muscular layer was exhibited. This is thought to be due to the protein catabolism possessed by the steroid, and it was suggested that it became a cause of delayed perforation observed in clinical.

On the other hand, the stricture suppressing effect observed in the CHST15 siRNA administered group was an effect that could be obtained while maintaining the muscular layer in a substantially normal state. It showed that peristalsis of the esophagus, that is, stricture was suppressed while maintaining the swallowing function substantially normal, and it was strongly suggested that it could be treated extremely safely in clinical practice.

In esophageal stricture after ESD in clinical practice, it is the present status that balloon dilation is performed repeatedly, and damage to the muscular layer must be avoided as much as possible, so that a plural number of administrations of steroids is considered to be avoided. In addition, there is recurrence in esophageal cancer, and in order to be able to safely apply the ESD treatment to the recurrent esophageal cancer, protection of the muscular layer is an absolute condition. It was considered that clinical usefulness of CHST15 siRNA was extremely high as compared with the steroid preparations in order to carry out repeated endoscopic therapy.

UTILIZABILITY IN INDUSTRY

The CHST15 siRNA of the present invention showed a remarkable stricture suppressing effect in the test using the esophageal stricture model after porcine esophageal entire circumference (100%) ESD, which was completely ineffective with existing therapies. In addition, since it has a muscular layer protective effect, it was thought that it would be possible to derive the appearance of a clinical site that could not be drawn at all in the past that it could enable high safety (there is no risk of perforation unlike existing treatments), maintenance of the function of the muscular layer (swallowing function), or repeated endoscopic therapy.

From these results, it was shown that the CHST15 siRNA of the present invention is useful as a novel esophageal stricture suppressing agent.

SEQUENCE LISTING

FP4429 ST25.txt

---

The invention claimed is:

1. A method of suppressing the occurrence of esophageal stricture following esophageal endoscopic submucosal dissection (ESD) to treat esophageal cancer in a patient, the method comprising:
   locally administering directly to the esophageal tissue of a patient following an esophageal ESD procedure an effective amount of a pharmaceutical composition comprising from 100 nM to 10,000 nM of an siRNA that suppresses expression of a CHST15 gene;
   wherein the esophageal ESD is an entire circumference ESD;
   wherein the occurrence of an esophageal stricture in the patient is suppressed by the effective amount of the pharmaceutical composition; and
   wherein the siRNA comprises a duplex molecule comprising a polynucleotide having the sequence of SEQ ID NO: 1 hybridized to a polynucleotide having the sequence of SEQ ID NO: 2.

2. The method of claim 1, wherein the occurrence of an esophageal stricture in the patient is suppressed for at least two weeks following the esophageal ESD.

3. The method of claim 2, wherein the muscular layer of the esophagus of the patient is protected.

4. The method of claim 2, wherein the esophagus of the patient is free of pathological fibrosis deeper than the stratified squamous epithelium.

5. The method of claim 3, wherein the esophagus of the patient is free of pathological fibrosis deeper than the stratified squamous epithelium.

* * * * *

SEQUENCE LISTING

```
<160> NUMBER OF SEQ ID NOS: 4

<210> SEQ ID NO 1
<211> LENGTH: 27
<212> TYPE: RNA
<213> ORGANISM: Artificial Sequence
<220> FEATURE:
<223> OTHER INFORMATION: sirna

<400> SEQUENCE: 1
ggagcagagc aagaugaaua caaucag                                           27

<210> SEQ ID NO 2
<211> LENGTH: 27
<212> TYPE: RNA
<213> ORGANISM: Artificial Sequence
<220> FEATURE:
<223> OTHER INFORMATION: sirna

<400> SEQUENCE: 2
gauuguauuc aucuugcucu gcuccau                                           27

<210> SEQ ID NO 3
<211> LENGTH: 4713
<212> TYPE: DNA
<213> ORGANISM: Homo sapiens
<220> FEATURE:
<221> NAME/KEY: CDS
<222> LOCATION: (514)..(2199)

<400> SEQUENCE: 3
ggaaatctgg cattttttaa agtttgcgcc ccacaaagag gaaatattcc aaaggtactc      60
aggatgtaaa aggggagatc ttcacagatg cctccgtgga tggcatggca atccatccat     120
caatgagaag accatgattt cttttaattt tctgtgtgtt tccacattcc ccagtgagaa     180
ttcttccacc ttttttttgtg ccatgggaaa aacctgaagg gcaggcagag ctgctcccga    240
```

-continued

```
acttgtgacc ttctctgagg ttgcagcggc tcttgtagaa catgactctg ggacatcact    300
tccttttgtt ttctttcgga gctgaaccaa agaatgtgca ccctcttcct ctagtgctgt    360
ggtgtctgct tattttgta tttgtgcttt ccatccatct tctgtgatca caaggcattc     420
ttaaggtttt ctagcacgac ttgcggacat ccagactcgt gggggggccca cccatggctc   480 ggtaagccag cagcccaggg cactggcact acc atg agg cac tgc att aat tgc    534
                                    Met Arg His Cys Ile Asn Cys
                                    1               5 tgc ata cag ctg tta ccc gac ggc gca cac aag cag cag gtc aac tgc    582
Cys Ile Gln Leu Leu Pro Asp Gly Ala His Lys Gln Gln Val Asn Cys
        10              15                  20 caa ggg ggc ccc cat cac ggt cac cag gcg tgc ccc acg tgc aaa gga    630
Gln Gly Gly Pro His His Gly His Gln Ala Cys Pro Thr Cys Lys Gly
    25              30                  35 gaa aac aaa att ctg ttt cgt gtg gac agt aag cag atg aac ttg ctt    678
Glu Asn Lys Ile Leu Phe Arg Val Asp Ser Lys Gln Met Asn Leu Leu
40              45                  50                  55 gct gtt ctc gaa gtg agg act gaa ggg aac gaa aac tgg ggt ggg ttt    726
Ala Val Leu Glu Val Arg Thr Glu Gly Asn Glu Asn Trp Gly Gly Phe
                60                  65                  70 ttg cgc ttc aaa aag ggg aag cga tgt agc ctc gtt ttt gga ctg ata    774
Leu Arg Phe Lys Lys Gly Lys Arg Cys Ser Leu Val Phe Gly Leu Ile
            75                  80                  85 ata atg acc ttg gta atg gct tct tac atc ctt tct ggg gcc cac caa    822
Ile Met Thr Leu Val Met Ala Ser Tyr Ile Leu Ser Gly Ala His Gln
        90                  95                  100 gag ctt ctg atc tca tca cct ttc cat tac gga ggc ttc ccc agc aac    870
Glu Leu Leu Ile Ser Ser Pro Phe His Tyr Gly Gly Phe Pro Ser Asn
    105                 110                 115 ccc agc ttg atg gac agc gaa aac cca agt gac aca aag gag cat cac    918
Pro Ser Leu Met Asp Ser Glu Asn Pro Ser Asp Thr Lys Glu His His
120                 125                 130                 135 cac caa tcc tct gta aat aat att tca tac atg aag gac tat cca agc    966
His Gln Ser Ser Val Asn Asn Ile Ser Tyr Met Lys Asp Tyr Pro Ser
                140                 145                 150 att aaa tta att atc aac agc atc aca act agg att gag ttc acg acc   1014
Ile Lys Leu Ile Ile Asn Ser Ile Thr Thr Arg Ile Glu Phe Thr Thr
            155                 160                 165 aga cag ctc cca gac tta gaa gac ctt aag aag cag gag ttg cat atg   1062
Arg Gln Leu Pro Asp Leu Glu Asp Leu Lys Lys Gln Glu Leu His Met
        170                 175                 180 ttt tca gtc atc ccc aac aaa ttc ctt cca aac agt aag agc ccc tgt   1110
Phe Ser Val Ile Pro Asn Lys Phe Leu Pro Asn Ser Lys Ser Pro Cys
    185                 190                 195 tgg tac gag gag ttc tcg ggg cag aac acc acc gac ccc tac ctc acc   1158
Trp Tyr Glu Glu Phe Ser Gly Gln Asn Thr Thr Asp Pro Tyr Leu Thr
200                 205                 210                 215 aac tcc tac gtg ctc tac tcc aag cgc ttc cgc tcc acc ttc gac gcc   1206
Asn Ser Tyr Val Leu Tyr Ser Lys Arg Phe Arg Ser Thr Phe Asp Ala
                220                 225                 230 ctg cgc aag gcc ttc tgg ggc cac ctg gcg cac gcg cac ggg aag cac   1254
Leu Arg Lys Ala Phe Trp Gly His Leu Ala His Ala His Gly Lys His
            235                 240                 245 ttc cgc ctg cgc tgc ctg ccg cac ttc tac atc ata ggg cag ccc aag   1302
Phe Arg Leu Arg Cys Leu Pro His Phe Tyr Ile Ile Gly Gln Pro Lys
        250                 255                 260 tgc ggg acc aca gac ctc tat gac cgc ctg cgg ctg cac cct gag gtc   1350
Cys Gly Thr Thr Asp Leu Tyr Asp Arg Leu Arg Leu His Pro Glu Val
265                 270                 275
```

```
aag ttc tcc gcc atc aag gag cca cac tgg tgg acc cgg aag cgc ttt      1398
Lys Phe Ser Ala Ile Lys Glu Pro His Trp Trp Thr Arg Lys Arg Phe
280                 285                 290                 295 gga atc gtc cgc cta aga gat ggg ctg cga gac cgc tat ccc gtg gaa      1446
Gly Ile Val Arg Leu Arg Asp Gly Leu Arg Asp Arg Tyr Pro Val Glu
                300                 305                 310 gat tat ctg gac ctc ttt gac ctg gcc gca cac cag atc cat caa gga      1494
Asp Tyr Leu Asp Leu Phe Asp Leu Ala Ala His Gln Ile His Gln Gly
            315                 320                 325 ctg cag gcc agc tct gca aag gag cag agc aag atg aat aca atc att      1542
Leu Gln Ala Ser Ser Ala Lys Glu Gln Ser Lys Met Asn Thr Ile Ile
        330                 335                 340 atc ggg gag gcc agt gcc tcc acg atg tgg gat aat aat gcc tgg acg      1590
Ile Gly Glu Ala Ser Ala Ser Thr Met Trp Asp Asn Asn Ala Trp Thr
    345                 350                 355 ttc ttc tac gac aac agc acg gat ggc gag cca ccg ttt ctg acg cag      1638
Phe Phe Tyr Asp Asn Ser Thr Asp Gly Glu Pro Pro Phe Leu Thr Gln
360                 365                 370                 375 gac ttc atc cac gcc ttt cag cca aat gcc aga ctg att gtc atg ctc      1686
Asp Phe Ile His Ala Phe Gln Pro Asn Ala Arg Leu Ile Val Met Leu
                380                 385                 390 agg gac cct gtg gag agg ttg tac tca gac tat ctc tac ttt gca agt      1734
Arg Asp Pro Val Glu Arg Leu Tyr Ser Asp Tyr Leu Tyr Phe Ala Ser
            395                 400                 405 tcg aat aaa tcc gcg gac gac ttc cat gag aaa gtg aca gaa gca ctg      1782
Ser Asn Lys Ser Ala Asp Asp Phe His Glu Lys Val Thr Glu Ala Leu
        410                 415                 420 cag ctg ttt gaa aat tgc atg ctt gat tat tca ctg cgc gcc tgc gtc      1830
Gln Leu Phe Glu Asn Cys Met Leu Asp Tyr Ser Leu Arg Ala Cys Val
    425                 430                 435 tac aac aac acc ctc aac aac gcc atg cct gtg agg ctc cag gtt ggg      1878
Tyr Asn Asn Thr Leu Asn Asn Ala Met Pro Val Arg Leu Gln Val Gly
440                 445                 450                 455 ctc tat gct gtg tac ctt ctg gac tgg ctc agc gtt ttt gac aag caa      1926
Leu Tyr Ala Val Tyr Leu Leu Asp Trp Leu Ser Val Phe Asp Lys Gln
                460                 465                 470 cag ttt ctc att ctt cgc ctg gaa gat cat gca tcc aac gtc aag tac      1974
Gln Phe Leu Ile Leu Arg Leu Glu Asp His Ala Ser Asn Val Lys Tyr
            475                 480                 485 acc atg cac aag gtc ttc cag ttt ctg aac cta ggg ccc tta agt gag      2022
Thr Met His Lys Val Phe Gln Phe Leu Asn Leu Gly Pro Leu Ser Glu
        490                 495                 500 aag cag gag gct ttg atg acc aag agc ccc gca tcc aat gca cgg cgt      2070
Lys Gln Glu Ala Leu Met Thr Lys Ser Pro Ala Ser Asn Ala Arg Arg
    505                 510                 515 ccc gag gac cgg aac ctg ggg ccc atg tgg ccc atc aca cag aag att      2118
Pro Glu Asp Arg Asn Leu Gly Pro Met Trp Pro Ile Thr Gln Lys Ile
520                 525                 530                 535 ctg cgg gat ttc tac agg ccc ttc aac gct agg ctg gcg cag gtc ctc      2166
Leu Arg Asp Phe Tyr Arg Pro Phe Asn Ala Arg Leu Ala Gln Val Leu
                540                 545                 550 gcg gat gag gcg ttt gcg tgg aag acg acg tga gagctgaatt gttgctgcac   2219
Ala Asp Glu Ala Phe Ala Trp Lys Thr Thr
            555                 560 gtgctgggcc cgccaatgcc gtcatcatca ggattttaca aatctctttg cggggaactg    2279
tttcactcat ggtatggaaa acccccaggac tctgccactc taggcacaca tgaattataa   2339
ccatttggga atttccttcg tgatgttcga gagctcagca atggaccccct cacagagctc   2399
```

```
ctctatccga ggccattgga gacccagtt tctcaagaat tcagctctgc tctgagcgtc    2459
ctggagcttg gggatgcagc cagctggcct gcactgggtg tggagagaac acctagggaa   2519
ggcagcctgg ccctgcccgc ctccgccttc tggagagcct ctgggttctg agtcagcaag   2579
ccagaggtca tgccacaggc ctggctggaa cttacacttc acgttccctt ttttcccccc   2639
tagagatggg gtctcgccgt gttgcacaga ctgtctgtat tcaatggcta tcttcacagg   2699
tgtgatcata ccacattcac ttctgaaaca ctcttgttgc gatcgctaac ctcactggga   2759
cagagaaccg cagtctttcg agaatggagg ctcttcattt ttttttttctc ctttactcca   2819
aactcagccc tccagtttct tcagatgtaa accctgttaa cgtcactgtt tccaaaagga   2879
aaaaaataag tcagttttttg gcagcacctt catctttctg acctcctcct attctgtcct   2939
tgtggactta tgtttaacat agaaaatgaa tgcgtttaaa acaaaaccac tttctgcatt   2999
taaccagtcc tggctctctc tctgctgcct cttcatacgt tttctcaaga acttcagttt   3059
ataattggaa gagaaatttt tgctgttaat gccagaatga gcaacctcaa ggaattgaac   3119
acttcttgga aaatctaggt aattcaagcc ctcatcaggt ttacaagatc atcagagaaa   3179
cagaggattt taatttttag ttctggccgg ctacaggctc catttctctg ccttcccatt   3239
ggaaatagtt tatttccaca ttctccactg cgtgtggtca aagttcctca cccagcaagg   3299
gactatagat actcgtgtcc caattccaaa acacaatgca caagctgaac ttgggctgaa   3359
cgtggcgtgt tgagatttgg aatgaggttt ctaagagccg tgttcttcat ggaattttcc   3419
aggccacttg gcagcttggt ttaccgatgg atgggctaga gatcttgtcg tttcttggaa   3479
gtcacaggga agattgaaga gaacgcttga gcatccttgg caacagccca ggtgggacct   3539
ggatgaagct ttgcactcaa gtattgtcaa gggaagcttc ctgtgaacca aagttctcag   3599
gccaaggtct cgcccaccaa agccagaaag tgcaagcacc cgtctaccca gctctaactt   3659
gtatgtgtga gacagaccag gcttcggggg taggaggatc tgcagttgtt cagccgtctt   3719
tctgctggtt ttgtctttct gccatcagag aagggacaca cagcccgttc gaaggtgtgc   3779
agagggctct gagcgccagg atggccaggg ctgttttttgc tactgaagga gcgtgtgtcc   3839
tgaactccca cttgcaggga cagtccccac cttctctata gccggcactg ggagcagccg   3899
ccagcaggga aatctggcct gagcacaagg atgctttagg gagagatcac ttcagtgtgt   3959
gtgtatattt atttgcagta cagtgcgcgc gtgtgtgtgt gtgtacgcgc acgtgtgggt   4019
gagtgcgtct tctgagtggg ttctgttcag ttgctaatga ggctcctccg ctctggacac   4079
aaccccttta tagattaatt tctctgccaa ttaacttgtc attttcagta catattttac   4139
tattccacac caaccataat tacaacaagg gattttttctt atgcactcct atgcatgtga   4199
ataacatgtg gtgtaattct gcttcttaca gaagtattac tgaaggtatt atttccaata   4259
ttatttggtt tattatgcgg atctttttta tatatgcagt cccatcccctt ctgtgccact   4319
caatgccatc cagacatggt tttttccctcc agggggccttt ctctccagag ggcacttcgg   4379
ctgcctctgc ttcctctcat tcgaggcccg gctcttgctg acagaatagg ttccgttctg   4439
ggcggtggtt ctcgagcctg ccattcaaaa ccaaagcaaa ttggagcatt tctcacaaca   4499
tggtattgaa gttcctttt gttctcaaaa gttgtgaccg tgttaaattg tactcccctta   4559
gtcctgtaag gtatgttaag tgaatcgcag ttacgctgta cttttattaa tatttaacat   4619
aattaaagat ggacccataa gagtgacgcc tgtggagcgc gtgctcttcc tctgcagcca   4679
aaaaaaaaaa aaaaaaaaaa aaaaaaaaaa aaaa                               4713
```

```
<210> SEQ ID NO 4
<211> LENGTH: 561
<212> TYPE: PRT
<213> ORGANISM: Homo sapiens

<400> SEQUENCE: 4

Met Arg His Cys Ile Asn Cys Cys Ile Gln Leu Leu Pro Asp Gly Ala
1               5                   10                  15

His Lys Gln Gln Val Asn Cys Gln Gly Gly Pro His His Gly His Gln
            20                  25                  30

Ala Cys Pro Thr Cys Lys Gly Glu Asn Lys Ile Leu Phe Arg Val Asp
        35                  40                  45

Ser Lys Gln Met Asn Leu Leu Ala Val Leu Glu Val Arg Thr Glu Gly
    50                  55                  60

Asn Glu Asn Trp Gly Gly Phe Leu Arg Phe Lys Lys Gly Lys Arg Cys
65                  70                  75                  80

Ser Leu Val Phe Gly Leu Ile Ile Met Thr Leu Val Met Ala Ser Tyr
                85                  90                  95

Ile Leu Ser Gly Ala His Gln Glu Leu Leu Ile Ser Ser Pro Phe His
            100                 105                 110

Tyr Gly Gly Phe Pro Ser Asn Pro Ser Leu Met Asp Ser Glu Asn Pro
        115                 120                 125

Ser Asp Thr Lys Glu His His His Gln Ser Ser Val Asn Asn Ile Ser
    130                 135                 140

Tyr Met Lys Asp Tyr Pro Ser Ile Lys Leu Ile Ile Asn Ser Ile Thr
145                 150                 155                 160

Thr Arg Ile Glu Phe Thr Thr Arg Gln Leu Pro Asp Leu Glu Asp Leu
                165                 170                 175

Lys Lys Gln Glu Leu His Met Phe Ser Val Ile Pro Asn Lys Phe Leu
            180                 185                 190

Pro Asn Ser Lys Ser Pro Cys Trp Tyr Glu Glu Phe Ser Gly Gln Asn
        195                 200                 205

Thr Thr Asp Pro Tyr Leu Thr Asn Ser Tyr Val Leu Tyr Ser Lys Arg
    210                 215                 220

Phe Arg Ser Thr Phe Asp Ala Leu Arg Lys Ala Phe Trp Gly His Leu
225                 230                 235                 240

Ala His Ala His Gly Lys His Phe Arg Leu Arg Cys Leu Pro His Phe
                245                 250                 255

Tyr Ile Ile Gly Gln Pro Lys Cys Gly Thr Thr Asp Leu Tyr Asp Arg
            260                 265                 270

Leu Arg Leu His Pro Glu Val Lys Phe Ser Ala Ile Lys Glu Pro His
        275                 280                 285

Trp Trp Thr Arg Lys Arg Phe Gly Ile Val Arg Leu Arg Asp Gly Leu
    290                 295                 300

Arg Asp Arg Tyr Pro Val Glu Asp Tyr Leu Asp Leu Phe Asp Leu Ala
305                 310                 315                 320

Ala His Gln Ile His Gln Gly Leu Gln Ala Ser Ser Ala Lys Glu Gln
                325                 330                 335

Ser Lys Met Asn Thr Ile Ile Ile Gly Glu Ala Ser Ala Ser Thr Met
            340                 345                 350

Trp Asp Asn Asn Ala Trp Thr Phe Phe Tyr Asp Asn Ser Thr Asp Gly
        355                 360                 365

Glu Pro Pro Phe Leu Thr Gln Asp Phe Ile His Ala Phe Gln Pro Asn
    370                 375                 380
```

-continued

```
Ala Arg Leu Ile Val Met Leu Arg Asp Pro Val Glu Arg Leu Tyr Ser
385                 390                 395                 400

Asp Tyr Leu Tyr Phe Ala Ser Ser Asn Lys Ser Ala Asp Asp Phe His
            405                 410                 415

Glu Lys Val Thr Glu Ala Leu Gln Leu Phe Glu Asn Cys Met Leu Asp
            420                 425                 430

Tyr Ser Leu Arg Ala Cys Val Tyr Asn Asn Thr Leu Asn Asn Ala Met
        435                 440                 445

Pro Val Arg Leu Gln Val Gly Leu Tyr Ala Val Tyr Leu Leu Asp Trp
    450                 455                 460

Leu Ser Val Phe Asp Lys Gln Gln Phe Leu Ile Leu Arg Leu Glu Asp
465                 470                 475                 480

His Ala Ser Asn Val Lys Tyr Thr Met His Lys Val Phe Gln Phe Leu
            485                 490                 495

Asn Leu Gly Pro Leu Ser Glu Lys Gln Glu Ala Leu Met Thr Lys Ser
            500                 505                 510

Pro Ala Ser Asn Ala Arg Arg Pro Glu Asp Arg Asn Leu Gly Pro Met
            515                 520                 525

Trp Pro Ile Thr Gln Lys Ile Leu Arg Asp Phe Tyr Arg Pro Phe Asn
        530                 535                 540

Ala Arg Leu Ala Gln Val Leu Ala Asp Glu Ala Phe Ala Trp Lys Thr
545                 550                 555                 560

Thr
```